United States Patent
Nishimura

(10) Patent No.: US 6,209,257 B1
(45) Date of Patent: Apr. 3, 2001

(54) SPRAYING APPARATUS FOR AGRICULTURAL CHEMICALS

(75) Inventor: Shiro Nishimura, Pompéia (BR)

(73) Assignee: Maquinas Agricolas Jacto, Pompeia (BR)

( * ) Notice: Subject to any disclaimer, the term of this patent is extended or adjusted under 35 U.S.C. 154(b) by 0 days.

(21) Appl. No.: 08/730,850

(22) Filed: Oct. 17, 1996

(51) Int. Cl.$^7$ .................................................. A01C 15/00
(52) U.S. Cl. ........................................................ 47/1.7
(58) Field of Search ......................................... 47/1.7

(56) References Cited

U.S. PATENT DOCUMENTS

| | | |
|---|---|---|
| 4,768,713 | 9/1988 | Roper . |
| 4,823,268 | 4/1989 | Giles et al. . |
| 5,002,227 * | 3/1991 | Ehrenberg ............... 47/1.7 |
| 5,028,002 * | 7/1991 | Whitford ................. 47/1.7 |
| 5,144,767 * | 9/1992 | McCloy et al. .......... 47/1.7 |
| 5,222,324 | 6/1993 | O'Neall et al. . |
| 5,251,818 * | 10/1993 | Manor et al. ............. 47/1.7 |
| 5,278,423 | 1/1994 | Wangler et al. . |
| 5,315,564 | 5/1994 | Upton . |
| 5,842,307 * | 12/1998 | May ......................... 47/1.7 |

FOREIGN PATENT DOCUMENTS

| | | | |
|---|---|---|---|
| 3207645 * | 9/1982 | (DE) | ............... 47/1.7 |
| 3901463 * | 9/1982 | (DE) | ............... 47/1.7 |

* cited by examiner

Primary Examiner—Michael J. Carone
Assistant Examiner—Joanne C. Downs
(74) Attorney, Agent, or Firm—Michael J. Striker

(57) ABSTRACT

A spraying apparatus for spraying agricultural chemicals over shrubbery and small size arborous trees and plants in early stages of their growth positioned in arrays with empty areas therebetween, the spraying apparatus has a storage for an agricultural chemicals to be sprayed, a spraying assembly having the shape of an upside down U and provided with a plurality of spraying nozzles, a detector for detecting the presence of a plant, and an activator for activating the spraying nozzles, after the detector detects a plant to spray the plants inside the spraying assembly.

10 Claims, 11 Drawing Sheets

FIG. 4
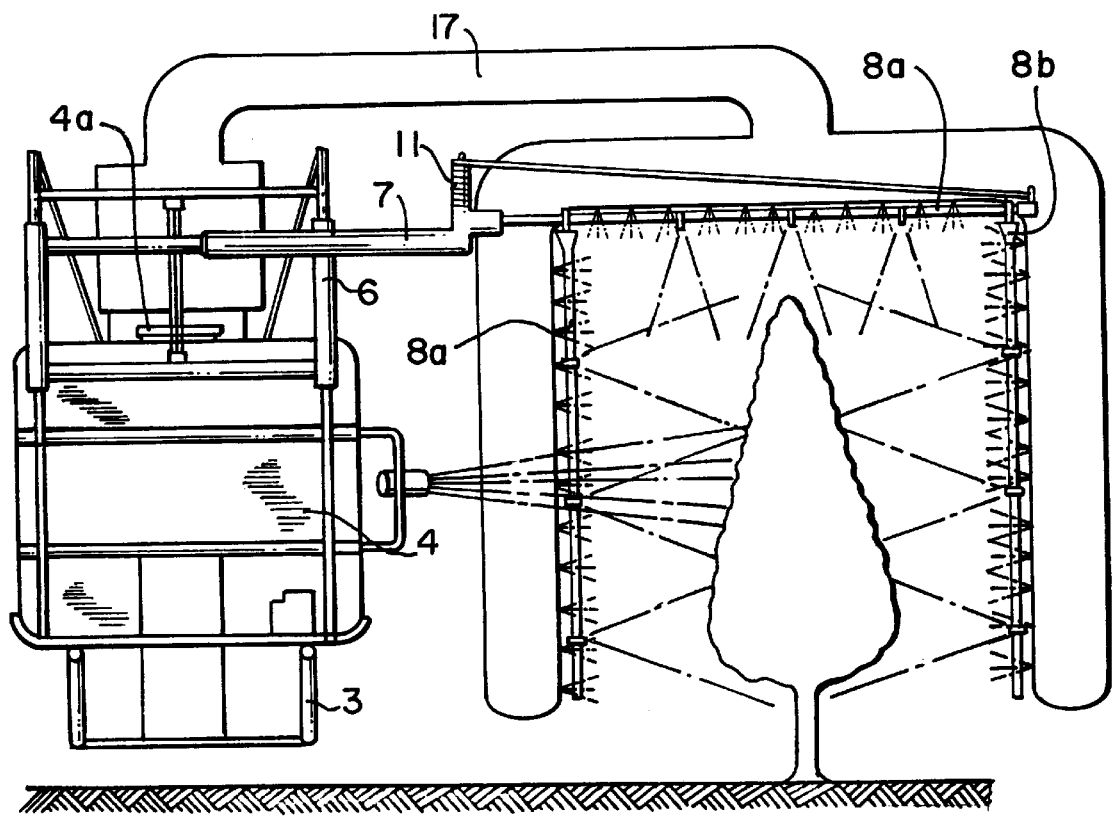
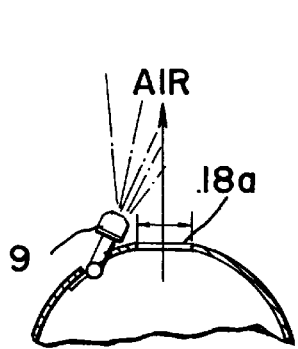
FIG.5
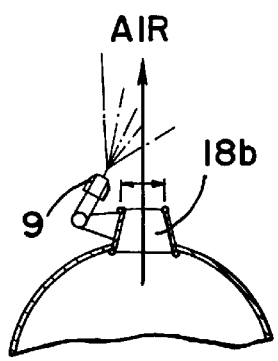
FIG.6

SPRAYING APPARATUS FOR AGRICULTURAL CHEMICALS

BACKGROUND OF THE INVENTION

The present invention generally relates to agricultural equipment, and more particularly to a spraying apparatus for spraying agricultural chemicals on shrubby and/or small size arboreous crops or other types of plants during the early stages of their growth when the plants are disposed in lines or arrays with empty areas between them.

It is widely known to spray shrubbery and/or small size arboreous trees, or even bigger trees in the early stages of their growth with a spraying apparatus which may or may not be provided with means for detecting the presence of a plant in the area to be sprayed. The known spraying apparatuses are usually adjusted to the plants to be sprayed. This procedure, however, brings about a number of drawbacks, starting with the inadequate dimension of the machines which therefore spray volumes of agricultural chemicals much greater than necessary. As a result, when a spraying apparatus is not provided with detecting means for detecting the presence of a plant in a spraying area, huge amounts of chemicals are wasted, resulting in loss of the chemicals and environmental pollution, since the chemicals are continuously sprayed even in the areas between the plants.

When the spraying apparatus is provided with a detecting means to spray the chemicals only when a tree is detected in a spraying target area, such machines are designed for use with grown up plants. The drawbacks of these machines are that they are not efficient due to the fact that the machines are positioned away from the plants as they pass along the center of the passages defined by the arrays of plants. Also, such machines provided with the detecting means usually have speed sensors in order to compensate for the distance between the detecting means and the spraying nozzles along the spraying apparatus. Thereby there is a high probability that the chemical can be wasted. Due to the small size of the shrubbery and/or arborous trees, it is possible that the delayed activation of the spraying nozzle in response to the detection of a tree in a spraying target area may happen before the tree has reached the target area or after it has already passed it. Thereby the chemicals will be sprayed into the air and not on the plant, and only a part of the chemical reaches the plant.

Another alternative which is used for spraying of shrubby and/or small size araborus trees is to manually spray the chemicals with spraying guns. However, this solution goes against the present tendency of mechanisiziation of agricultural works. In addition, it is a very difficult, dangerous and in some places forbidden process.

SUMMARY OF THE INVENTION

Accordingly, it is an object of the present invention to provide a spraying apparatus of the above mentioned general type, which is particularly suitable for spraying agricultural chemicals over shrubby and/or small size arborus trees, or even other types of plants in early stages of their growth, which eliminates the disadvantages of the prior art.

More particularly, it is an object of present invention to provide such a spraying apparatus which allows an efficient spraying at both sizes of the plant substantially without waste of the chemicals and without polluting the environment.

In keeping with these objects and with others which will become apparent hereinafter, one feature of the present invention resides, briefly stated, in a spraying apparatus comprising a movable chases; means for storing an agricultural chemical to be sprayed; a spraying assembly connected with said chases and having the shape of an upside down "U" provided with a plurality of spraying nozzles, means for detecting a plant, and means for activating the spraying nozzles, after the detecting means detect a plant, to spray the plant within the upside down U-shaped spraying assembly.

When the spraying apparatus is designed in accordance with the present invention, the agricultural chemicals are sprayed only over the plants and no chemical is wasted in the empty areas between the plants. The spraying is highly efficient since the chemicals are sprayed near and around each plant reaching all sides of the plant simultaneously. The drivers attention is concentrated only on driving, since all other steps of spraying are performed automatically.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a rear view of a spraying assembly of the inventive spraying apparatus in accordance with a second embodiment of the present invention;

FIGS. 5 and 6 are views showing possible solutions for positioning spraying nozzles of the spraying assembly relative to air jets;

DESCRIPTION OF PREFERRED EMBODIMENTS

Figure 1:
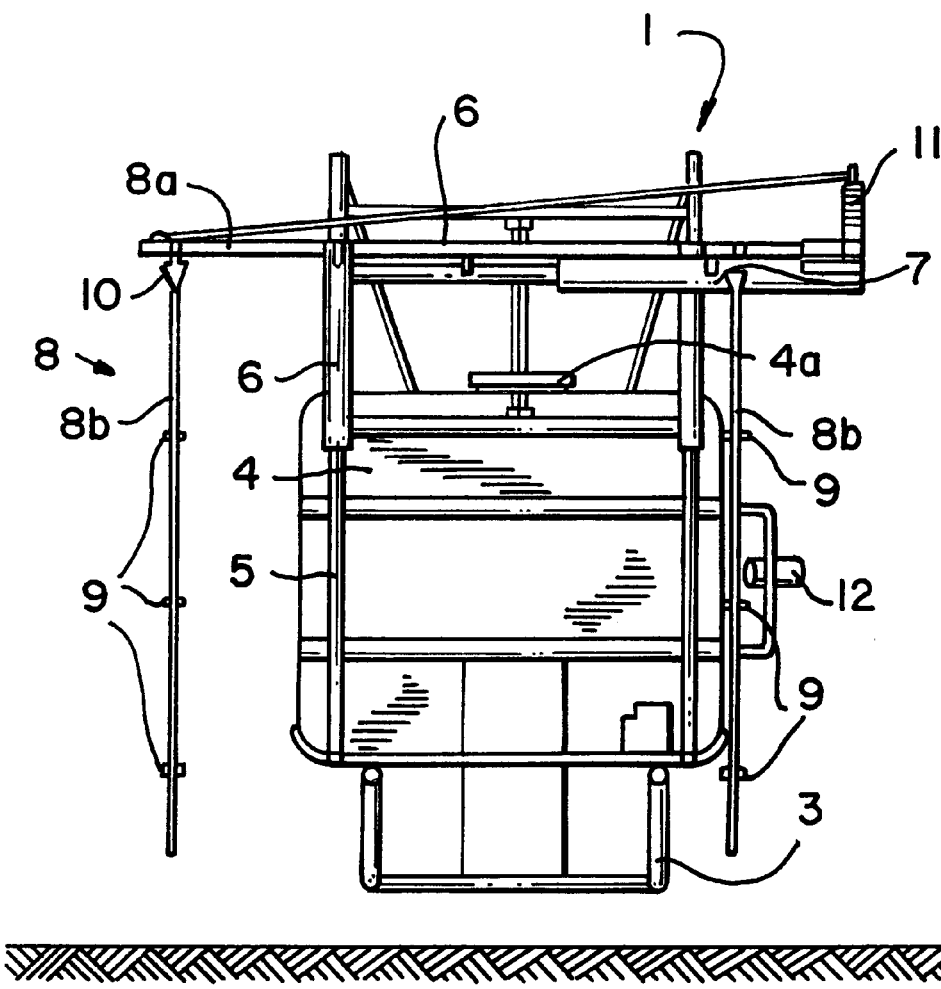
FIG. 1 is a rear view of a spraying assembly of a spraying apparatus in accordance with the present invention, in a transporting position.

A spraying apparatus in accordance with the present invention is identified as a whole with reference numeral 1 and can be towed by a tractor 2. The spraying apparatus 1 has a chassis 3, a storage tank 4 having lid 4a, a fixed frame structure 5 mounted at the rear end of the spraying apparatus and a movable frame structure 6 mounted over the fixed frame structure 5 in order to be vertically movable up and down. The movable frame structure 6 supports a beam 7 for mounting a spraying assembly 8.

The spraying assembly 8 is shaped as an upside down "U". It has a horizontal beam 8a and two vertical struts 8b. Hoses h are supported by the horizontal beam 8a and the vertical struts 8b and provided with a plurality of spraying nozzles 9. The supply of chemicals is performed from the tank 4 through the hoses h and the nozzles 9.

The vertical struts 8b are mounted on the horizontal beam 8a through pivoting elements 10 so that they are freely turnable in a vertical plane. Therefore in the event of impacts of the vertical struts 8b against the ground or against the plants, the vertical struts can deviate in the vertical plane, and damages to the spraying assembly are avoided. By arranging a spring 8c between the horizontal beam 8a and the vertical struts 8b, the struts can also deviate in another vertical plane. In addition, the vertical struts 8b are mounted on the horizontal beam 8a so that they can be displaced along the length of the horizontal beam to be brought closer to or farther from each other to reduce or to increase the distance between them. In each adjusted position, the vertical struts 8b can be fixed by known fixing means, for example a fixing screw 10a. The horizontal beam 8a of the spraying assembly 8 can be also raised or lowered, for example by changing one bracket 8d to another having a different height. Therefore an exact adjustment of the elements of the spraying assembly can be performed to provide a precise deposition of the chemicals on the plant and therefore to increase the efficiency of the machine.

The whole spraying assembly 8 can be lifted or lowered. In particular, the spraying assembly 8 is connected with the movable frame structure 6 which moves vertically relative to the immovable frame structure 5 and can be fixed in any desired relative vertical position. Any fixing means can be provided for this purpose, for example holes provided in the frame structures 5 and 6 and bolts extending through the corresponding holes in their aligned condition.

A detecting means 11 produce an output signal in response to the presence of a plant in the area of the detecting means and supply the output signal to a data processing unit 14. The data processing unit 14 processes the data and acts on a valve 15a which controls opening and closing of the spraying nozzles 9. Manual knobs k are provided for manually adjusting a time period of spraying the plant, since depending on the type of the plant the time period of spraying has to be shorter or longer. With the manual knobs k the spraying start and the spraying finish can be adjusted correspondingly.

After the detecting means 12 detect the plant, the plant must be sprayed by the spraying assembly 8 a little later. In order to correct this delay, the data processing unit 14 operates with a fixed time delay which can be provided by a corresponding software and calculated on an estimated mean working speed of the spraying apparatus. The above mentioned manually controlled knobs k can also provide an adjustment of the delay when the apparatus is to be displaced with a different mean speed.

FIG. 4 shows a second embodiment of the spraying apparatus in accordance with the present invention. The spraying apparatus is provided with an air duct 17 which also has the shape of upside down "U" and arranged near the spraying assembly 8. The air duct is provided with a plurality of openings 18. Air jets are issued through the openings 18 and carry the chemicals supplied through the spraying nozzles 9 to the plant to improve the spraying. The openings can be formed as simple cuts 18a in the air duct as shown in FIG. 5, or as hollow radial projections shown in 18b in FIG. 6.

While in the shown embodiment, the detecting means 12 is positioned before the spraying nozzles 9, it is possible to arrange the detecting means 12 so that it is located exactly in the plane of the spraying nozzles 9, so that no time delay has to be introduced at all.

Figure 2:
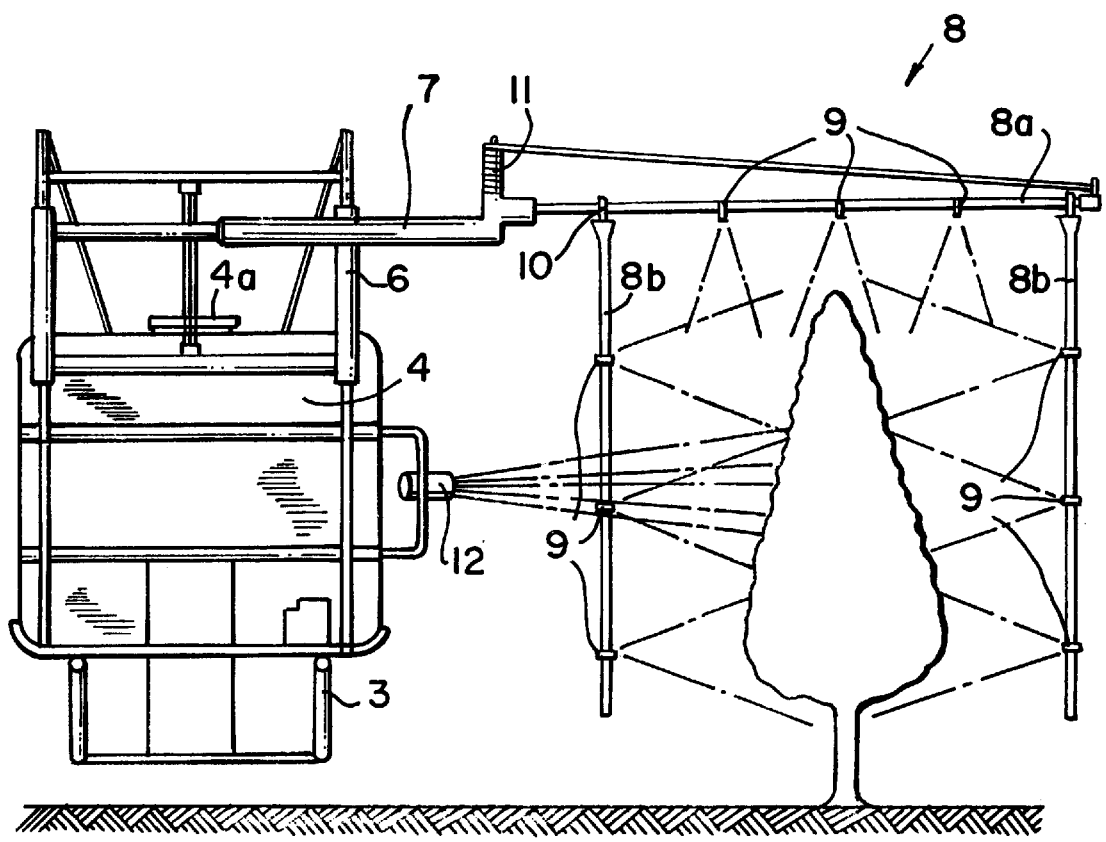
FIG. 2 is a view corresponding to the view of FIG. 1 but showing the spraying assembly in a working position with a plant being sprayed.
Figure 3:
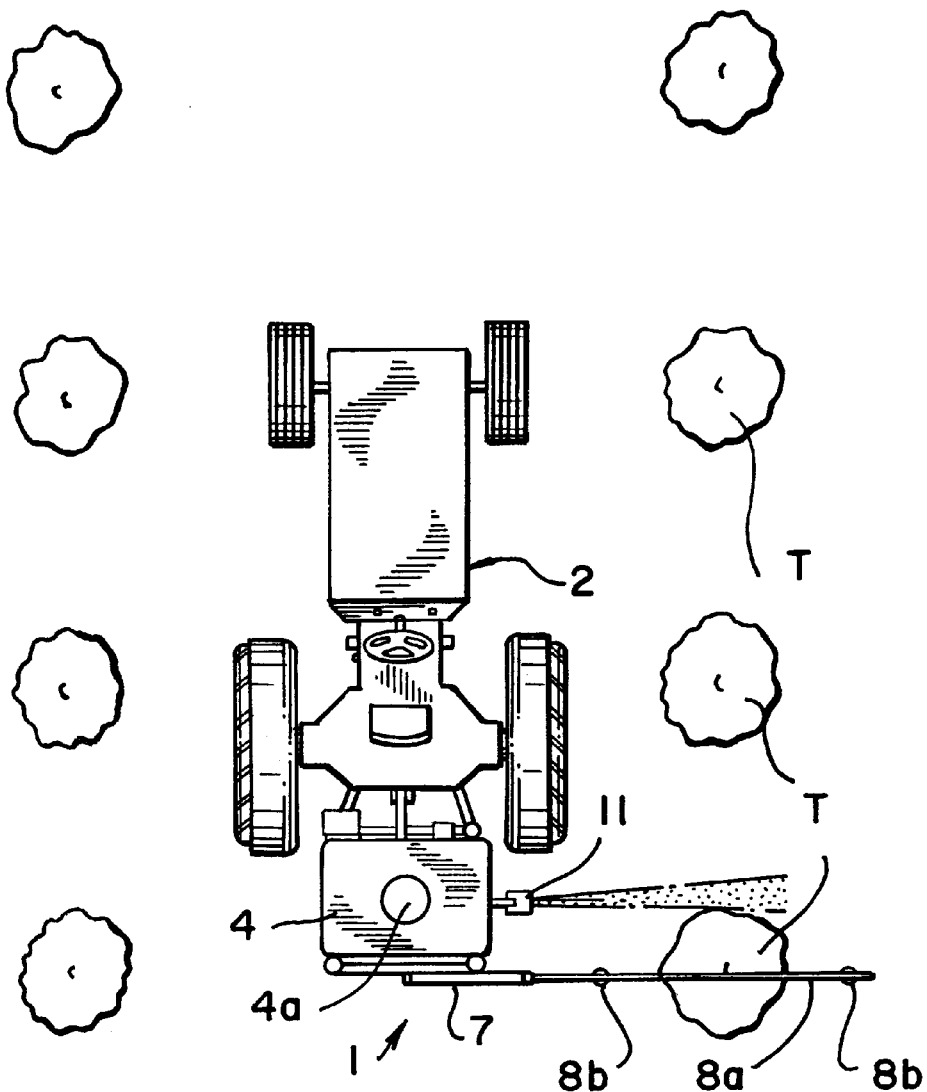
FIG. 3 is a plan view of the spraying apparatus in accordance with the present invention, towed by a tractor between two arrays of plants to be sprayed.
Figure 7A:
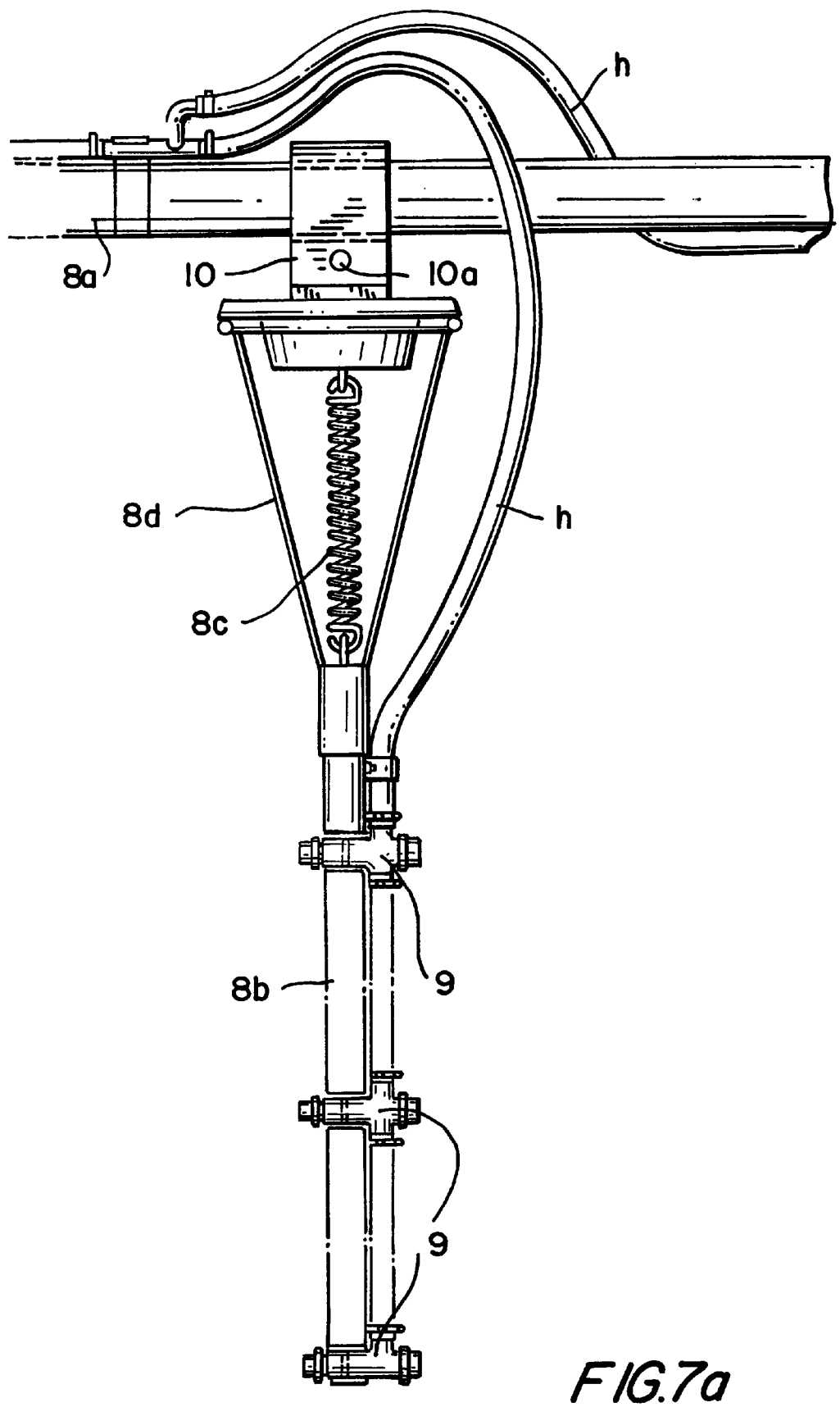
FIGS. 7a and 7b are views showing a connection of a vertical strut to a horizontal beam of a spraying assembly of the inventive spraying apparatus.
Figure 7:
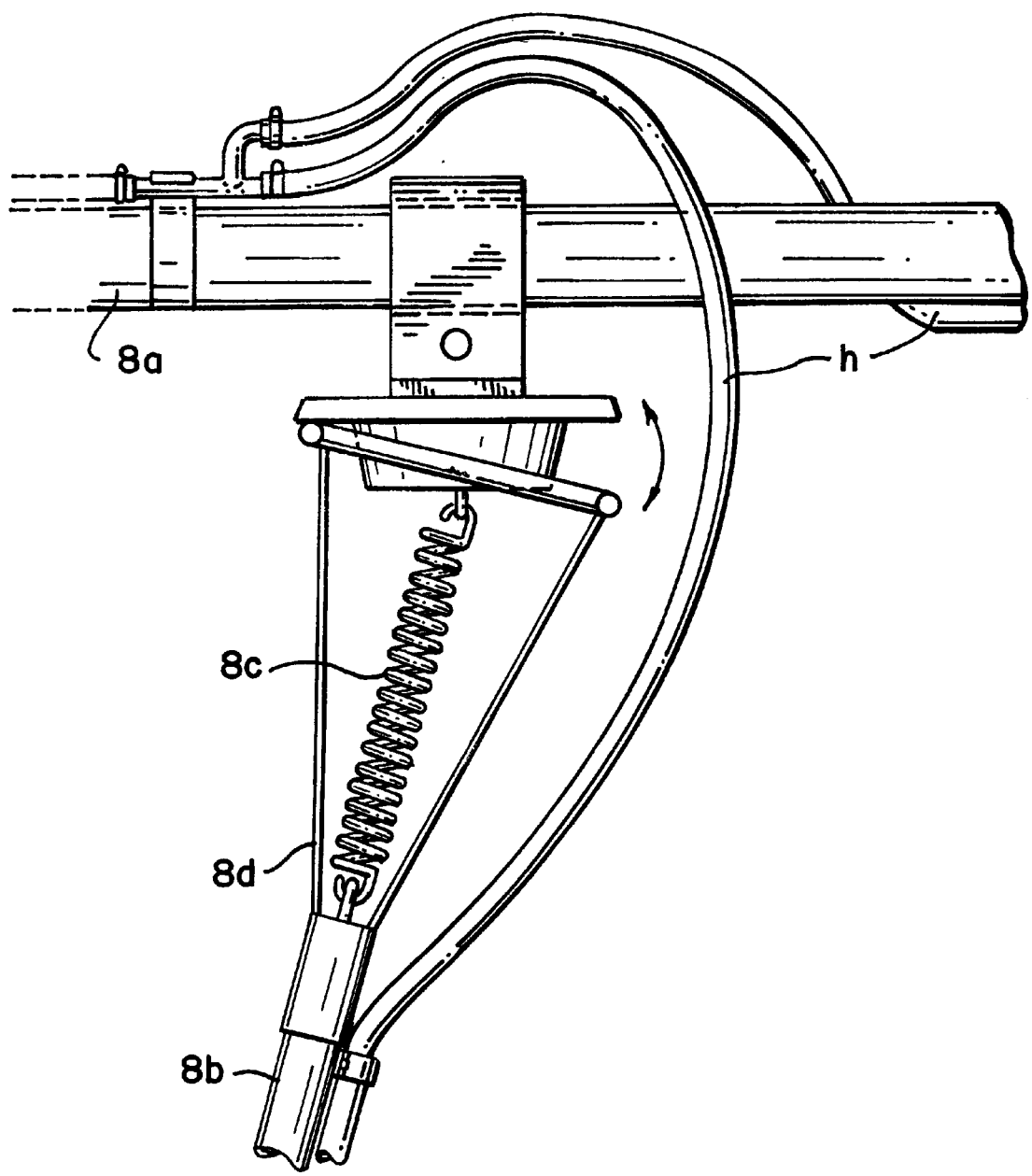
Figure 8:
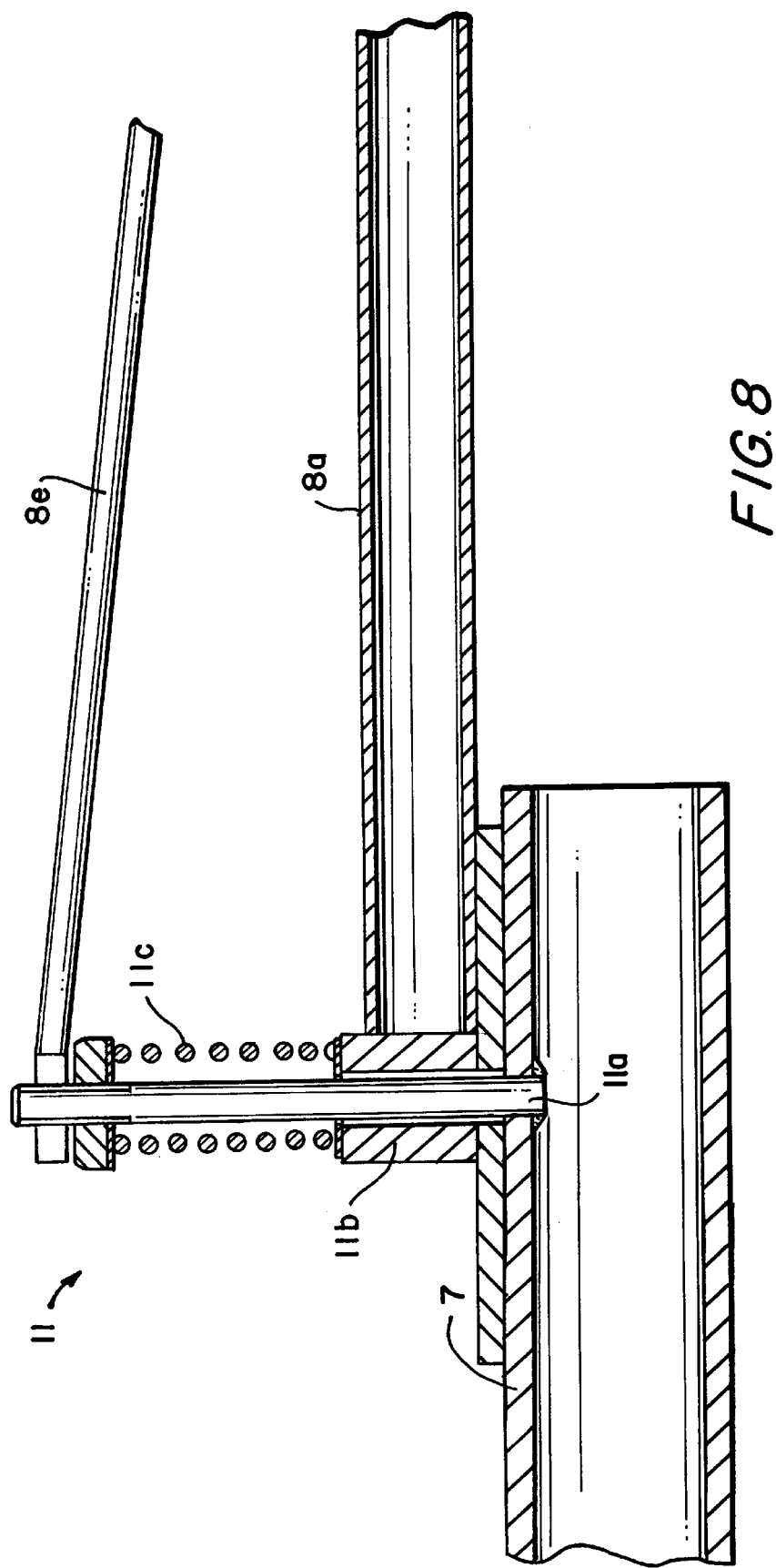
FIG. 8 is a view showing a turning connection of the spraying assembly of the chassis of the inventive spraying apparatus, to turn the spraying assembly between working and transporting positions.
Figure 9:
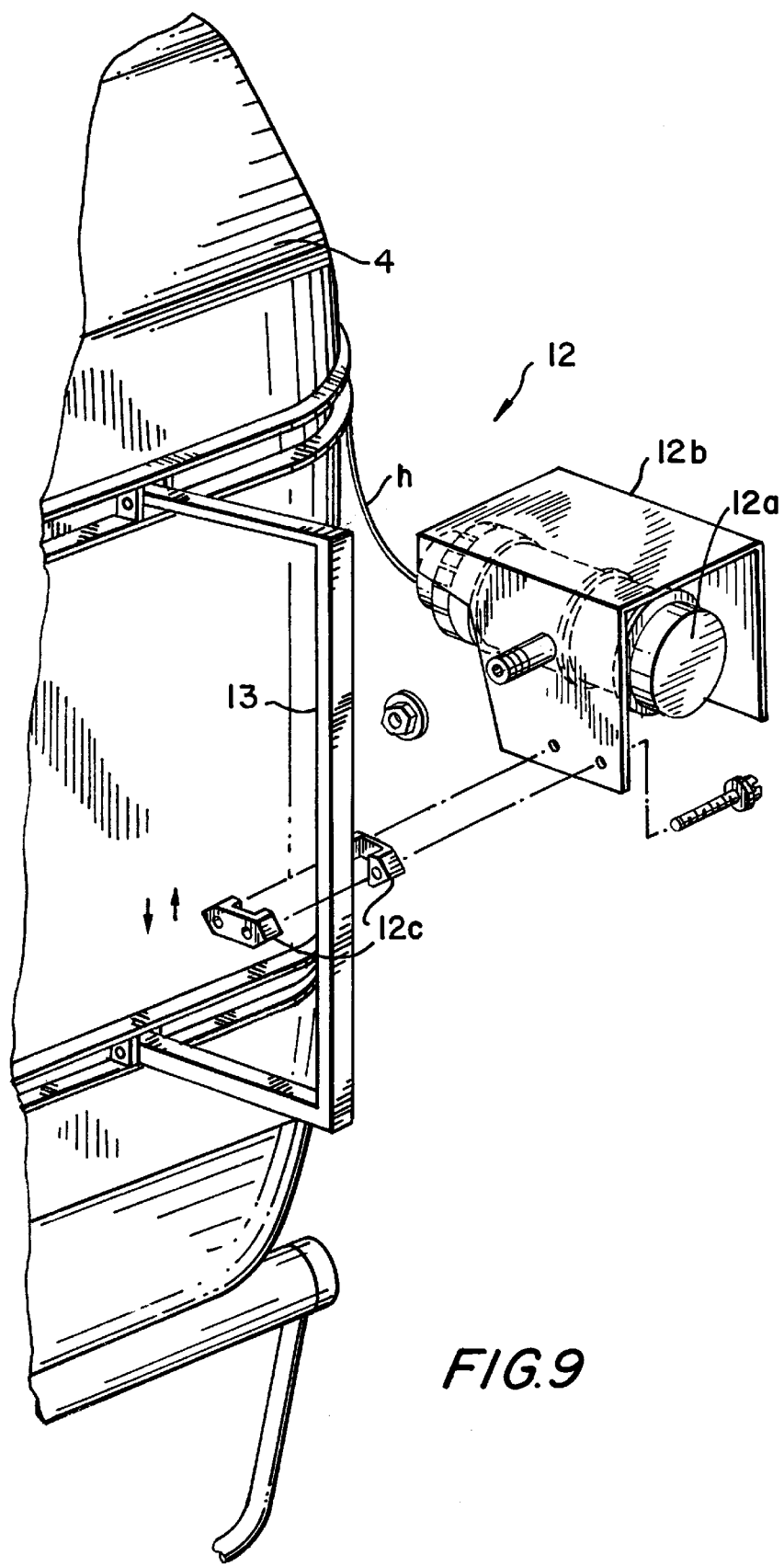
FIG. 9 is a perspective view showing an adjustable connection of a sensor of the inventive spraying apparatus.
Figure 10:
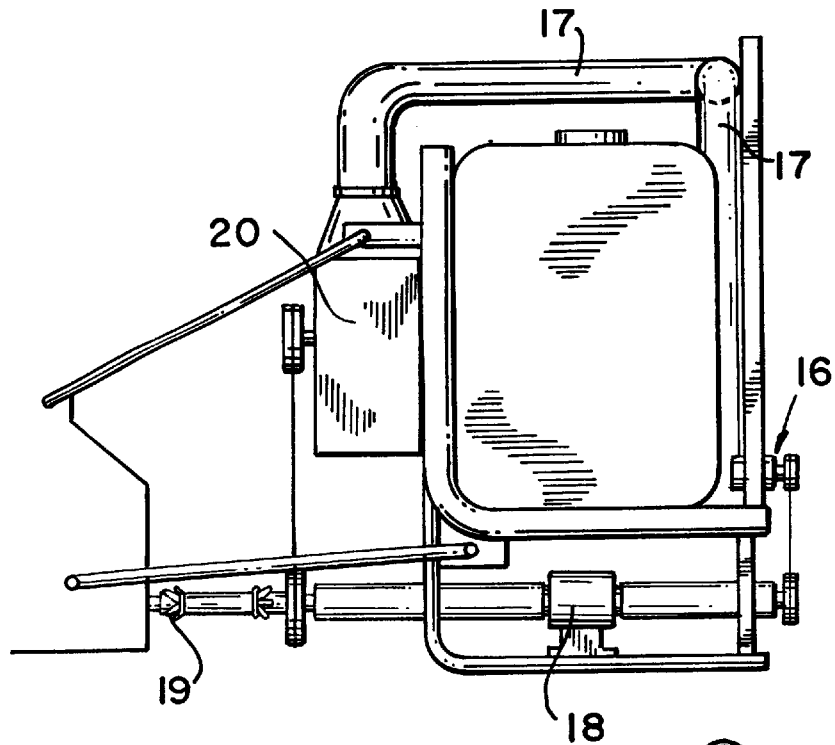
FIGS. 10 and 11 are a side view and a top view of the spraying assembly.
Figure 11:
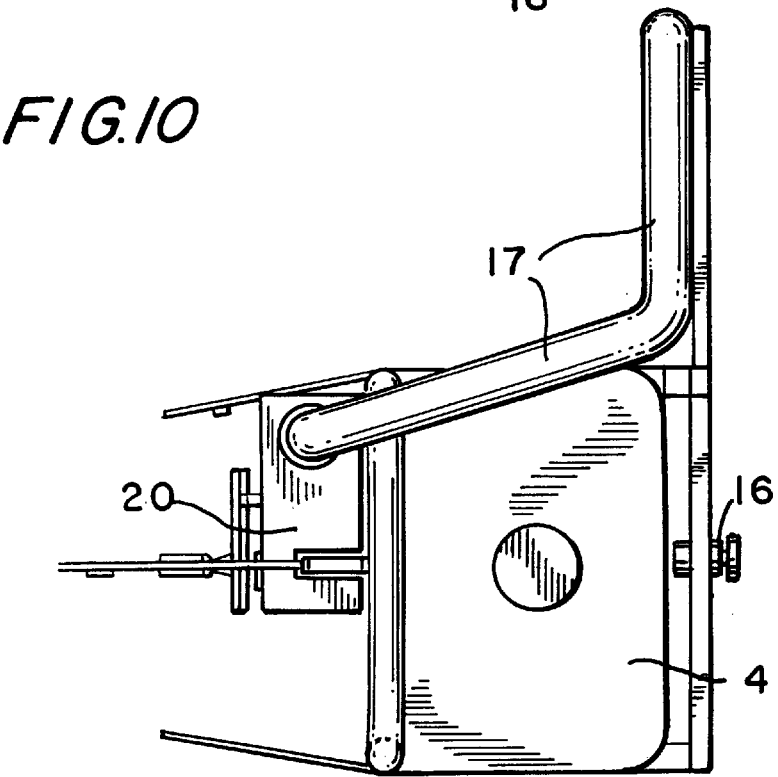
Figure 12:
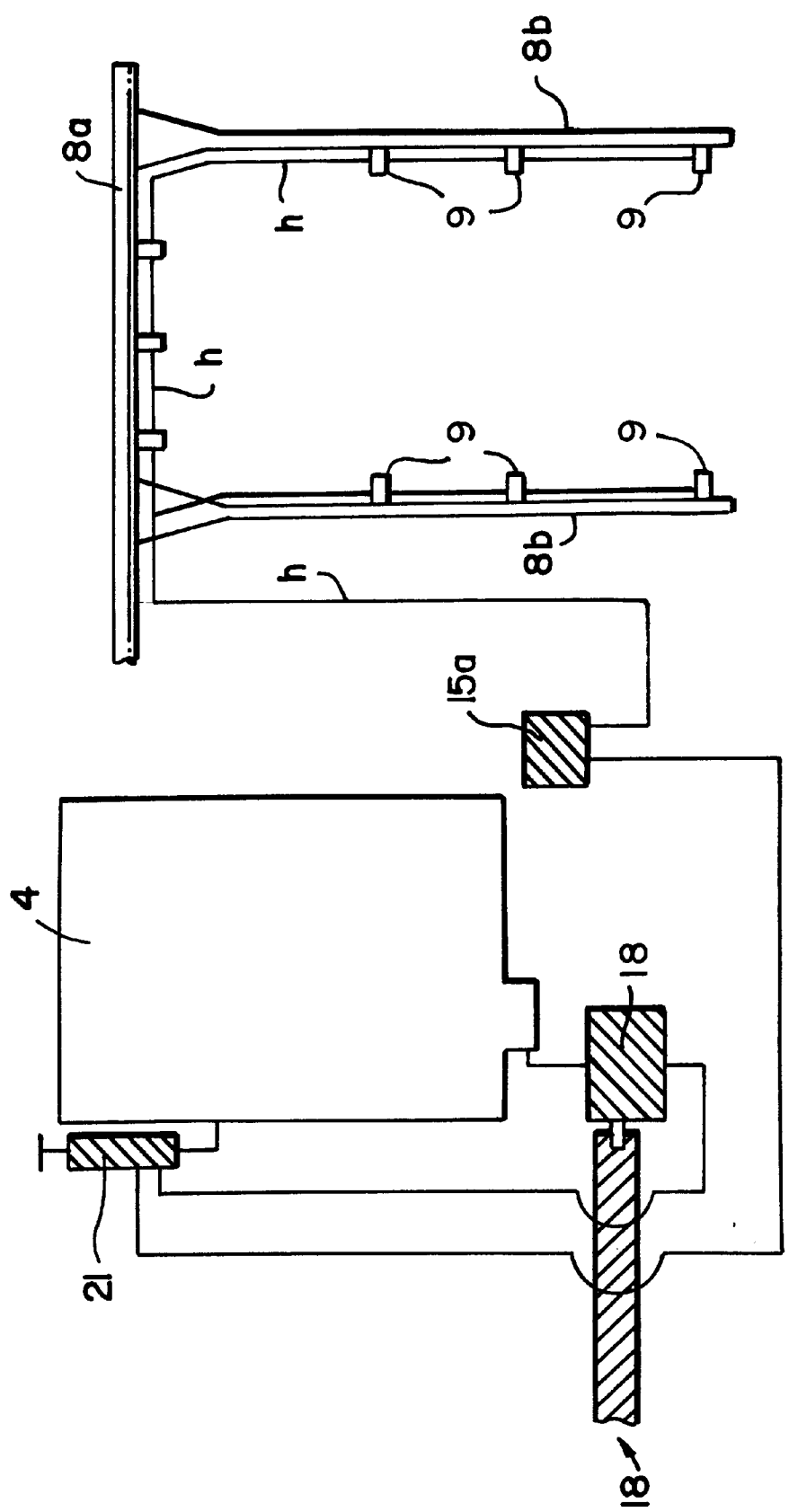
FIGS. 12 and 13 are views showing a hydraulic circuit and an electrical circuit of the spraying apparatus.
Figure 13:
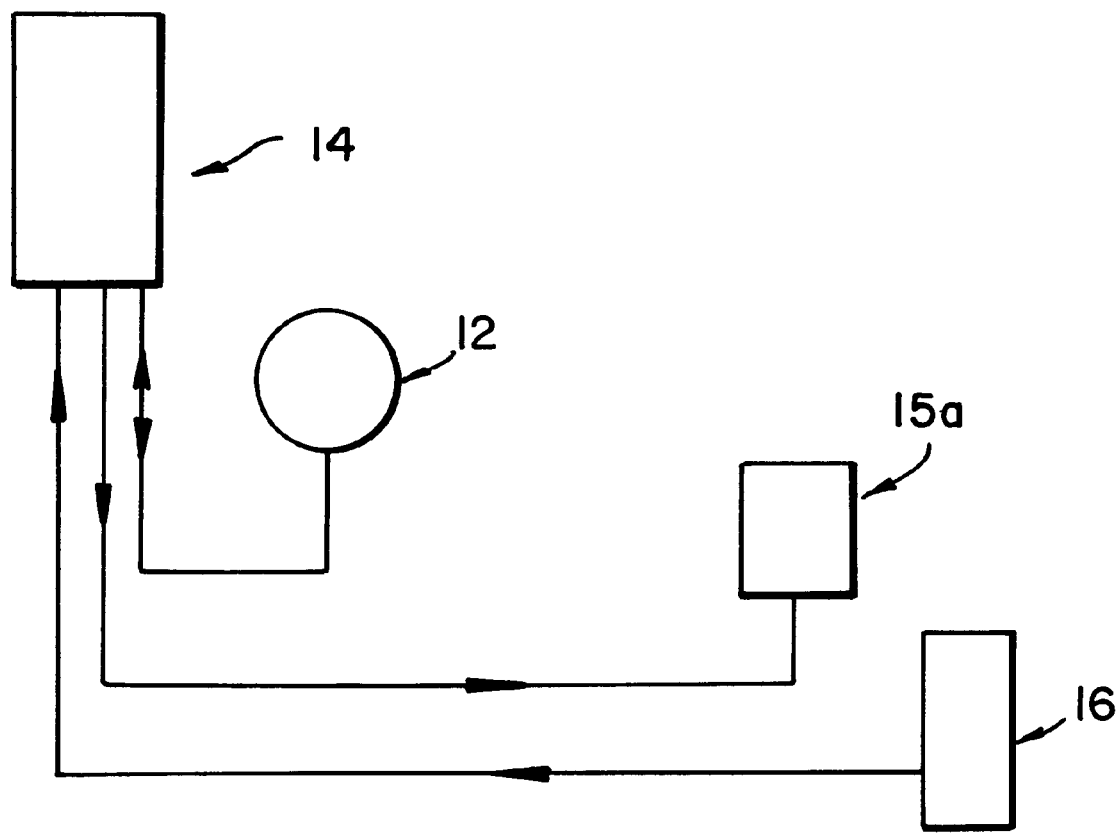

The spraying assembly 8 is connected to the mounting beam 7 through a fulcrum 11. The fulcrum 11 can include a vertical pin 11a connected to the beam 7 and a bushing 11b turnable aroudn the pin 11a and connected to the horizontal beam 8a, with a spring 11c positioned between the bushing 11b and support 8e. Thereby the spraying assembly 8 is horizontally pivotable about a substantially vertical axis between a working position and a transporting position. In the working position the spraying assembly is located laterally of the chassis 3 as shown in FIG. 2, while in the transporting position, the spraying assembly is folded over the chases 3 and the frame structures 5, 6 to be located behind the same as shown in FIG. 1.

The detecting means 12 preferably is formed as an ultra-sound detecting means. It is mounted on a supporting frame 13 at the side of the spraying apparatus facing the trees, close to the spraying assembly 8. The detecting means 12 formed for example as an ultrasound 12a sensor is mounted so that it can be displaced up and down in order to better detect the presence of a plant, and is fixed in each adjusted position by a clamp. For this purpose the sensor 12a is mounted in a casing 12b which is releasably fixed to the support by a clamp 12c.

The spraying apparatus is provided with a generator 16. A rotor of the generator 16 is driven in rotation through transmission elements by a pump 18 for pumping the chemicals through the hoses and the spraying nozzles. The generator 16 supplies current to the data processing unit 14, the sensing means 12, and the valve 15A, etc. Therefore, the spraying apparatus is independent from external electrical current sources. A pressure regulator 21 is also provided. The pump 18 is driven from a tractor take-off 19. A fan 20 which supplies air into the air duct 17 is also driven from the tractor take-off 19.

The spraying apparatus in accordance with the present invention operates in the following manner.

When the spraying apparatus is moved by a tractor between arrays of plants, the spraying assembly 8 is first properly positioned over the first plant by adjusting the height of the horizontal beam 8a and the distance between the vertical struts 8b to bring the spraying nozzles 9 to the most efficient position for spraying. During displacement of the spraying apparatus, a pump driven from a power source of the tractor generates a pressure required for spraying the chemicals through the spraying nozzles 9 and also drives the generator 16 that supplies power to the detecting means 12 and other elements of the apparatus. The detecting means 12 detect the presence of a plant and feeds the processing unit 14 with the output signal regarding the presence or absence of a plant in the spraying assembly 8. After the plant is detected, the valve 15a is activated to allow the passage of the chemical to the spraying nozzles 9.

It will be understood that each of the elements described above, or two or more together, may also find a useful application in other types of constructions differing from the types described above.

While the invention has been illustrated and described as embodied in a spraying apparatus for agricultural chemicals, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of thsi invention.

What is claimed as new and desired to be protected by Letters Patent is set forth in the appended claims:

1. A spraying apparatus for spraying agricultural chemicals over shrubbery and small size arborous trees and plants in early stages of their growth positioned in arrays with empty areas therebetween, the spraying apparatus comprising means for storing an agricultural chemical to be sprayed; a chassis which supports a frame; a spraying assembly located laterally of said frame and supported by said frame, said spraying assembly having the shape of a single upside down "U" and provided with a plurality of spraying nozzles; detecting means for detecting the presence of a plant and mounted on said frame laterally of said spraying assembly and forwardly of said spraying assembly as considered in direction of the movement of the spraying apparatus; and means for activating said spraying nozzles after the detecting means detects a plant, with a time delay to compensate for a distance between said detecting means and said spraying nozzles and for an apparatus speed, so as to spray a single plant located exactly within said upside down "U"-shaped spraying assembly, said spraying assembly having a horizontal beam which is adjustable as to its height relative to the ground and two substantially vertical struts provided with a plurality of said spraying nozzles and mounted on said substantially horizontal beam pivotably about a substantially horizontal axis to compensate for an impact of said vertical struts against an object and also movably along said substantially horizontal beam to bring said substantially vertical struts closer to and further from one another, said spraying assembly being connected with said frame turnably between a working position in which said spraying assembly is located laterally of said frame and a transporting position in which said spraying assembly is located behind said frame; and a plurality of further means for adjusting said substantially horizontal beam as to its height, for pivotably mounting said substantially vertical struts on said substantially horizontal beam, for movably connecting said substantially vertical struts relative to said substantially horizontal beam, and for turnably connecting said spraying assembly with said frame.

2. A spraying apparatus for spraying agricultural chemicals over shrubbery and small size arborous trees and plants in early stages of their growth positioned in arrays with empty areas therebetween, the spraying apparatus comprising means for storing an agricultural chemical to be sprayed; a spraying assembly having the shape of a single upside down "U" adapted to surround a single plant and provided with a plurality of spraying nozzles, detecting means provided for detecting the presence of a plant and located forwardly of said spraying assembly at a distance therefrom as considered in a traveling direction of the apparatus; and means for activating said spraying nozzles after the detecting means detects a plant, with a time delay to compensate for a distance between said detecting means and said spraying nozzles and for an apparatus speed, so as to spray a single plant located exactly within said upside down "U"-shaped spraying assembly, said spraying assembly having a substantially horizontal beam and two substantially vertical struts provided with a plurality of said spraying nozzles, said substantially vertically struts being mounted movable along said substantially horizontal beam to bring said substantially vertical struts closer to or farther form one another; and further comprising means for movably connecting said substantially vertical struts relative to said substantially horizontal beam.

3. A spraying apparatus as defined in claim 2, wherein said substantially horizontal beam is adjustable as to its height relative to a ground; and further comprising means for adjusting the height of said substantially horizontal beam relative to the ground.

4. A spraying apparatus for spraying agricultural chemicals over shrubbery and small size arborous trees and plants in early stages of their growth positioned in arrays with empty areas therebetween, the spraying apparatus comprising means for storing an agricultural chemical to be sprayed; a spraying assembly having the shape of a single upside down "U" adapted to surround a single plant and provided with a plurality of spraying nozzles, detecting means provided for detecting the presence of a plant and located forwardly of said spraying assembly at a distance therefrom as considered in a traveling direction of the apparatus; and means for activating said spraying nozzles after the detecting means detects a plant, with a time delay to compensate for a distance between said detecting means and said spraying nozzles and for an apparatus speed, so as to spray a single plant located exactly within said upside down "U"-shaped spraying assembly; a chassis for supporting said means for storing agricultural chemicals and said spraying assembly, said spraying assembly being connected with said chassis turnably between a working position in which said spraying assembly is located at a side of said chassis and a transporting position in which said spraying assembly is located behind said chassis; and means for turnably connecting said spraying assembly with said chassis.

5. A spraying apparatus as defined in claim 4, wherein said spraying assembly has a substantially horizontal beam and two substantially vertical struts provided with a plurality of said spraying nozzles.

6. A spraying apparatus as defined in claim 5, wherein said substantially vertical struts are mounted on said substantially horizontal beam pivotally about a substantially horizontal axis to compensate for an impact of said vertical struts against an obstacle during movement of the spraying apparatus; and further comprising means for pivotally mounting said substantially vertical struts on said substantially horizontal beam.

7. A spraying apparatus as defined in claim 4, wherein said means for turnably connecting said spraying assembly with said chassis includes a fulcrum having a substantially vertical axis of turning.

8. A spraying apparatus as defined in claim 4, wherein said detecting means is ultra-sound detecting means.

9. A spraying apparatus as defined in claim 4, wherein said detecting means is adjustable in a vertical direction; and further comprising means for adjusting said detecting means in a vertical direction.

10. A spraying apparatus for spraying agricultural chemicals over shrubbery and small size arborous trees and plants in early stages of their growth positioned in arrays with empty areas therebetween, the spraying apparatus comprising means for storing an agricultural chemical to be sprayed; a spraying assembly having the shape of a single upside down "U" adapted to surround a single plant and provided with a plurality of spraying nozzles, detecting means provided for detecting the presence of a plant and located forwardly of said spraying assembly at a distance therefrom as considered in a traveling direction of the apparatus; and means for activating said spraying nozzles after the detecting means detects a plant, with a time delay to compensate for a distance between said detecting means and said spraying nozzles and for an apparatus speed, so as to spray a single plant located exactly within said upside down "U"-shaped spraying assembly; pump means for pumping the chemicals through said spraying assembly; and an electrical current generator driven by said pump means so as to generate electrical current.

* * * * *